United States Patent [19]
Motamedi et al.

[11] Patent Number: 5,623,408
[45] Date of Patent: Apr. 22, 1997

[54] CRUISE CONTROL INFERENCE BASED SHIFT PATTERN CONTROL

[75] Inventors: Nader Motamedi, Santa Monica, Calif.; Larry T. Nitz, Rochester, Mich.; Susan L. Rees, Clawson, Mich.; Glenn P. O'Connell, Troy, Mich.

[73] Assignee: Saturn Corporation, Troy, Mich.

[21] Appl. No.: 398,599

[22] Filed: Mar. 3, 1995

[51] Int. Cl.⁶ ................................................. B60K 41/06
[52] U.S. Cl. ............................ 364/424; 180/170; 477/108
[58] Field of Search ........................... 364/424.1, 426.04; 180/170, 178, 179; 477/107, 108

[56] References Cited

U.S. PATENT DOCUMENTS

| | | | |
|---|---|---|---|
| 4,660,672 | 4/1987 | Katou | 477/108 X |
| 4,845,621 | 7/1989 | Kawata et al. | 364/424.06 |
| 4,905,786 | 3/1990 | Miyake et al. | 364/424.1 X |
| 5,038,880 | 8/1991 | Matsuoka et al. | 180/179 |
| 5,051,905 | 9/1991 | Yoshida | 364/424.1 |
| 5,148,721 | 9/1992 | Anan et al. | 364/424.1 X |
| 5,393,277 | 2/1995 | White et al. | 477/108 |

*Primary Examiner*—Collin W. Park
*Attorney, Agent, or Firm*—Vincent A. Cichosz

[57] ABSTRACT

A motor vehicle has a multi-speed automatic transmission and a cruise control system. A method of shift control when the cruise control system is enabled infers from a plurality of factors based on cruise control error quantities the desirability of forcing a downshift to a lower speed ratio.

25 Claims, 11 Drawing Sheets

CRUISE CONTROL INFERENCE BASED SHIFT PATTERN CONTROL

BACKGROUND OF THE INVENTION

This invention relates to an inference based automatic transmission shift pattern control.

Shifting in a multi-speed ratio automatic transmission is typically initiated in response to the detection of predefined vehicle speed and engine load conditions, referred to collectively as a shift pattern. Typically, upshift and downshift vehicle speed thresholds are determined as a function of an engine load parameter such as throttle position. An upshift is initiated if the actual vehicle speed exceeds the upshift threshold, and a downshift is initiated if the actual vehicle speed is lower than the downshift threshold.

During cruise control operation wherein the vehicle is controlled to a set speed, resumes a previously selected set speed or is accelerated to a higher set speed, reliance upon typical shift pattern control may undesirable result in overshoot of set speed, downshifts for relatively small and consistent speed deviation from set speed, and frequent shifting when the road load exceeds the torque delivery capacity of the drivetrain.

Shift controls are known which adhere to conventional shift pattern methodology in cruise control, differing however with the substitution of alternate vehicle speed versus engine load calibrations. While offering some improvement, substitution of alternate calibrations ultimately suffers from similar shortcomings, only at different vehicle speed versus engine load conditions.

SUMMARY OF THE INVENTION

A method of inference based shift control in accordance with the present invention is characterized by the features specified in claim 1 wherein a vehicle has a drivetrain comprising an engine coupled to an automatic transmission having a plurality of speed ratios selected in accordance with a predetermined shift schedule and a cruise control system regulating the speed of the vehicle. During cruise control speed regulation, a sensed vehicle parameter is used to initiate the calculation of a plurality of inference factors from which a pulldown determinant value is generated. The pulldown determinant value is thereafter compared to a limit value which, if exceeded, establishes a maximum engageable speed ratio. The lower of the maximum engageable speed ratio and the speed ratio selected by the shift schedule is engaged.

Preferably, the sensed parameter is throttle position and its exceeding a predetermined limit causes the initiation of the calculation of the plurality of inference factors.

In accordance with another aspect of the invention, when the sensed parameter does not exceed the predetermined limit, a prediction of torque capacity in the next higher gear is calculated and compared to a limit value to establish the maximum engageable speed ratio. Once again, the lower of the maximum engageable speed ratio and the speed ratio selected by the shift schedule is engaged.

Preferably, each of the plurality of inference factors is a diverse function of vehicle speed and acceleration quantities.

In accordance with another aspect of the present invention, the cruise control system may be enabled in one of a speed regulation mode (CRUISE), an acceleration mode (ACCEL), and a resume mode (RESUME). A sensed vehicle parameter is used to initiate the calculation of a plurality of inference factors from which a pulldown determinant value is generated when the enabled mode is one of CRUISE and ACCEL; otherwise, when the enabled mode is RESUME, the sensed vehicle parameter is used to initiate the calculation of a recovery time indicator. The one of the calculated pulldown determinant and recovery time indicator is then used to establish a maximum engageable speed ratio. Thereafter, the lower of the maximum engageable speed ratio and the speed ratio selected by the shift schedule is engaged.

By way of the shift control of the present invention, absolute authority of the predetermined shift pattern is displaced in favor of an inference based control wherein several factors which represent diverse vehicle operating conditions are utilized to determine the desirability of a pulldown from a presently engaged speed ratio prior to the point where a downshift might otherwise occur in strict conformance with the predetermined shift pattern. In addition, by maintaining the speed ratio engaged until such time as appropriate torque is available in the next higher gear, annoying frequency of shifting is greatly reduced. The overall effect is one of an improved balance between accurate and responsive speed regulation and shift busyness with associated disturbances.

DETAILED DESCRIPTION OF THE DRAWINGS

Figure 1A:
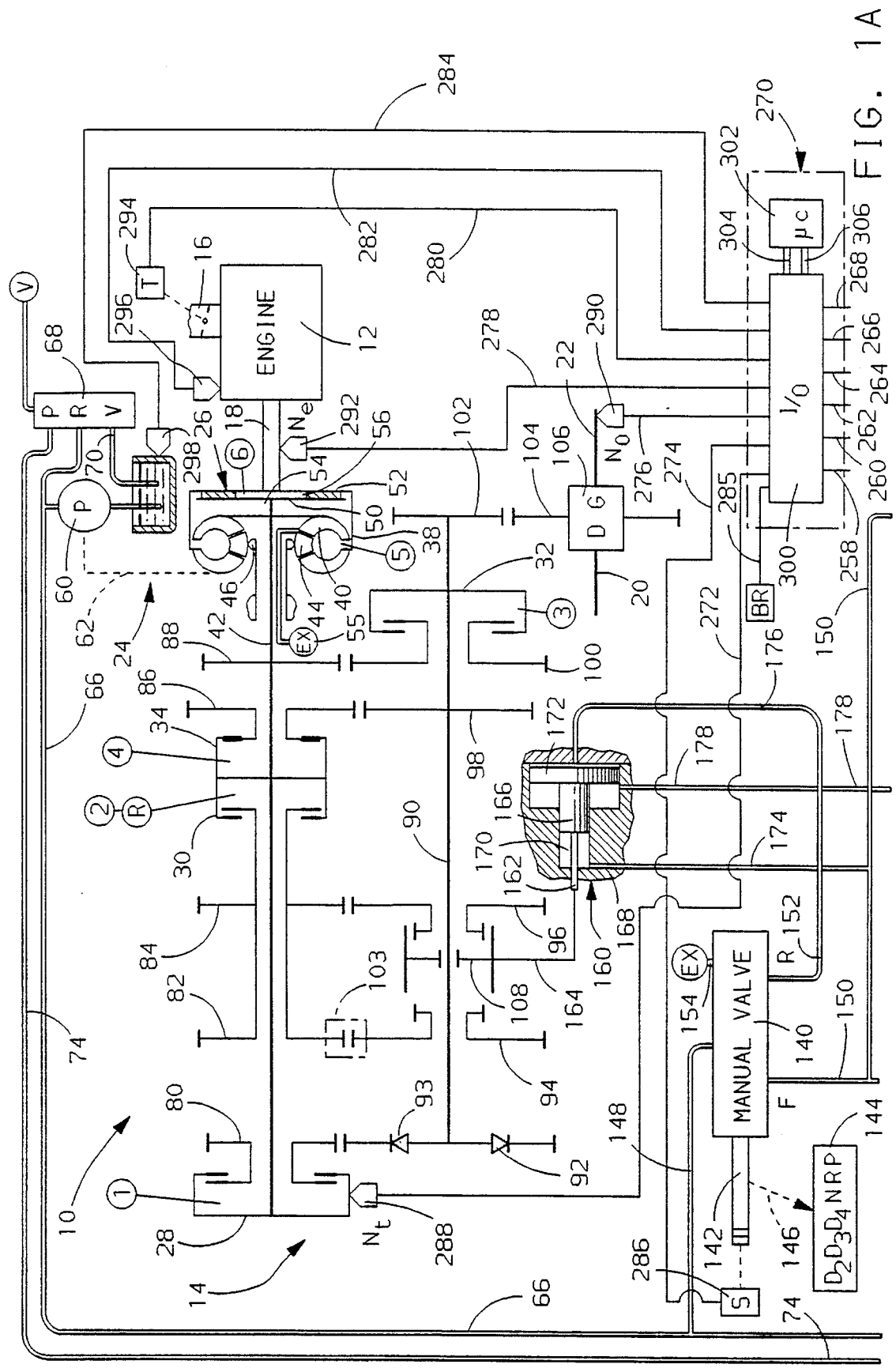
FIGS. 1A and 1B form a schematic diagram of an automatic transmission including a computer based control according to the present invention.
Figure 1B:
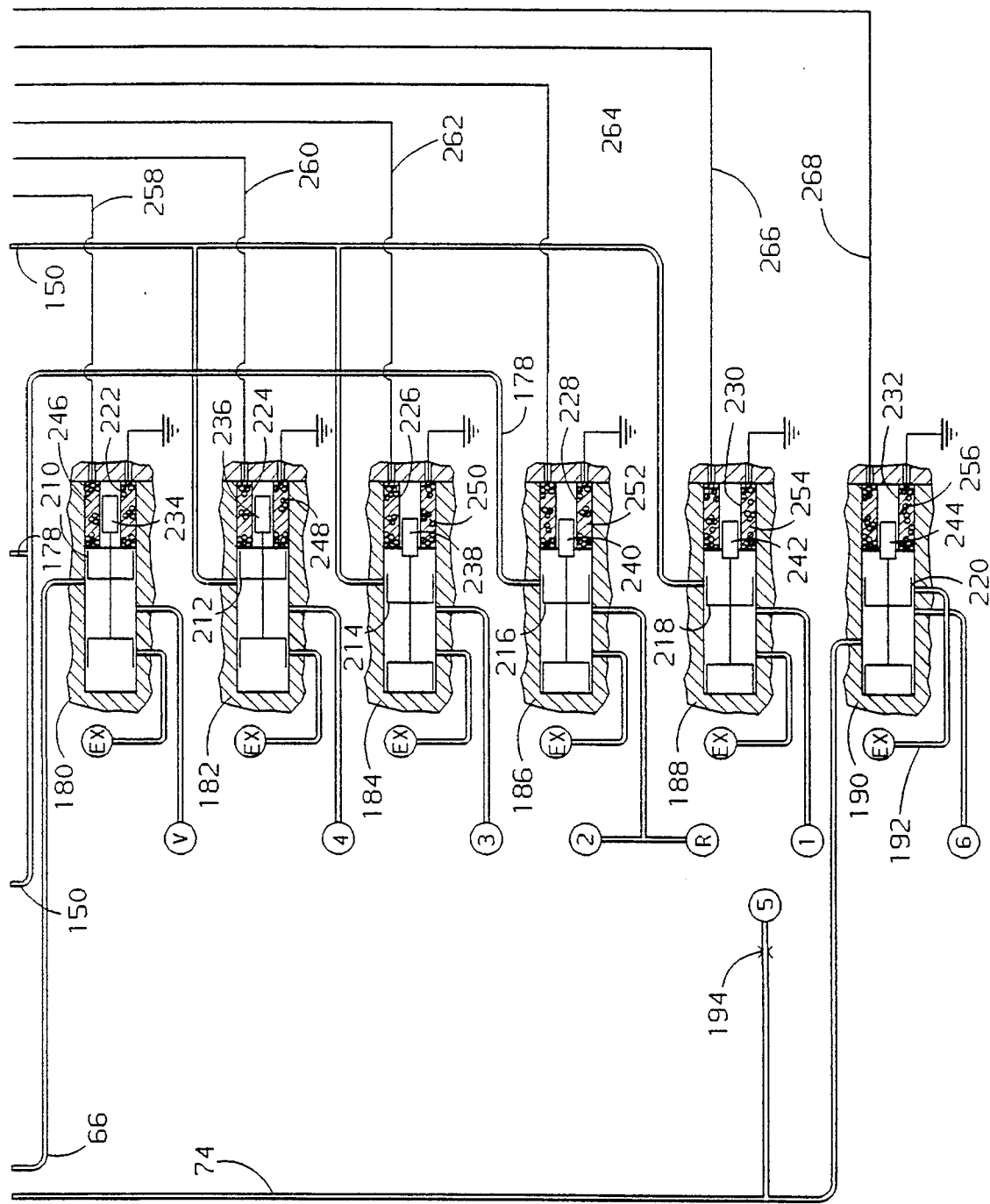

Referring particularly to FIGS. 1A and 1B, the reference numeral 10 generally designates a motor vehicle drivetrain including an engine 12 and a parallel shaft transmission 14 having a reverse speed ratio and four forward speed ratios. Engine 12 includes a throttle mechanism 16 mechanically connected to an operator manipulated device, such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26–34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14.

The torque converter 24 also includes a clutching device 26, also referred to herein as the torque converter clutch or TCC, comprising a clutch plate 50 connected to rotate with the turbine 40. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1, thereby engaging the TCC 26 to provide a mechanical drive connection in parallel with the torque converter 24. When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56. A fluid exhaust line 55 returns fluid from the torque converter 24 to a cooler (not shown).

A positive displacement hydraulic pump 60 is mechanically driven by the engine output shaft 18 through the input shell 38 and impeller 36, as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator 68 supplies fluid pressure for the torque converter 24 via line 74. While the pump and pressure regulator valve designs are not critical to the present invention, a representative pump is disclosed in the Schuster U.S. Pat. No. 4,342,545 issued Aug. 3, 1982, and a representative pressure regulator valve is disclosed in the Vukovich U.S. Pat. No. 4,283,970 issued Aug. 18, 1981, such patents being assigned to the assignee of the present invention.

The transmission shaft 42 and a further transmission shaft 90 each having a plurality of gear elements rotatably supported thereon. The gear elements 80–88 are supported on shaft 42 and the gear elements 92–102 are supported on shaft 90. The gear element 88 is rigidly connected to the shaft 42, and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28–34 each comprise an input member rigidly connected to a transmission shaft 42 or 90, and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28–34 is biased toward a disengaged state by a return spring (not shown).

Engagement of the clutching device is effected by supplying fluid pressure to an apply chamber thereof. The circled numeral 1 represents a fluid passage for supplying pressurized fluid to the apply chamber of clutching device 28; the circled numeral 2 and the letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80–88 and 92–100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28–34 in a released condition. The speed ratios defined by the various gear element pairs are generally characterized by the ratio of the turbine speed $N_t$ to output speed $N_o$. Representative $N_t/N_o$ ratios for transmission 14 are as follows:

| First | 2.368 | Second | 1.273 |
| Third | 0.808 | Fourth | 0.585 |
| Reverse | 1.880 | | |

The fluid control elements of the transmission 14 include a manual valve 140, a directional servo 160 and a plurality of electrically operated fluid valves 180–190. The manual valve 140 operates in response to operator demand and serves, in conjunction with directional servo 160, to direct regulated line pressure to the appropriate fluid valves 182–188. The fluid valves 182–188, in turn, are individually controlled to direct fluid pressure to the clutching devices 28–34. The fluid valve 180 is controlled to direct fluid pressure from the pump output line 66 to the pressure regulator valve 68. The fluid valve 190 is controlled to direct fluid pressure from the PRV output line 74 to TCC 26. The directional servo 160 operates in response to the condition of the manual valve 140 and serves to properly position the dog clutch 108.

The manual valve 140 includes a shaft 142 for receiving axial mechanical input from a range selector 144 which is positioned by the operator of the motor vehicle to obtain a desired transmission gear range. Fluid pressure from the pump output line 66 is applied as an input to the manual valve 140 via the line 148, and the valve outputs include a forward (F) output line 150 for supplying fluid pressure for engaging forward speed ratios and a reverse (R) output line 152 for supplying fluid pressure for engaging the reverse speed ratio. Thus, when the range selector 144 is moved to the D4, D3 or D2 positions, line pressure from the line 148 is directed to the forward (F) output line 150.

When the range selector 144 is in the R position, line pressure from the line 148 is directed to the reverse (R) output line 152. When the range selector 144 is in the N (neutral) or P (park) positions, the input line 148 is isolated, and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172.

When the range selector 144 is in a forward range position, the fluid pressure in the chamber 170 urges piston 166 rightward as viewed in FIG. 1 to engage the dog clutch 108 with the gear element 96 for enabling engagement of a forward speed ratio. When the range selector 144 is moved to the R position, the fluid pressure in chamber 172 urges piston 166 leftward as viewed in FIG. 1A to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180–190 each receive fluid pressure at an input passage thereof from the pump 60 or PRV 68, and are individually controlled to direct fluid pressure to the pressure regulator valve 68 or respective clutching devices 26–34. The fluid valve 180 receives line pressure directly from pump output line 66, and is controlled to direct a variable amount of such pressure to the pressure regulator valve 68, as indicated by the circled letter V. The fluid valves 182, 184 and 188 receive fluid pressure from the forward output line 150 of manual valve 140, and are controlled to direct variable amounts of such pressure to the clutching devices 34, 32 and 28, as indicated by the circled numerals 4, 3 and 1, respectively. The fluid valve 186 receives fluid pressure from the directional servo output line 178, and is controlled to direct a variable amount of such pressure to the clutching device 30, as indicated by the circled numeral 2 and the circled letter R.

The fluid valve 190 is adapted to alternately connect the release chamber 56 of torque converter 24 to fluid pressure line 74 and exhaust line 192, as indicated by the circled numeral 6. The apply chamber 54 of TCC 26 is supplied with fluid pressure from the fluid pressure line 74 via the orifice 194, as indicated by the circled numeral 5.

Each of the fluid valves 180–190 includes a spool element 210–220, axially movable within the respective valve body for directing fluid flow between input and output passages. When a respective spool element 210–220 is in the rightmost position as viewed in FIG. 1B, the input and output passages are connected. Each of the fluid valves 180–190 includes an exhaust passage, as indicated by the circled letters EX, such passage serving to drain fluid from the respective clutching device when the spool element is shifted to the leftmost position as viewed in FIG. 1B. In FIG. 1B, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines.

Each of the fluid valves 180–190 includes a solenoid 222–232 for controlling the position of its spool element 210–220. Each such solenoid 222–232 comprises a plunger 234–244 connected to the respective spool element 210–220 and a solenoid coil 246–256 surrounding the respective plunger. One terminal of each such solenoid coil 246–256 is connected to ground potential as shown, and the other terminal is connected to an output line 258–268 of a control unit 270 which governs the solenoid coil energization. As set forth hereinafter, the control unit 270 pulse width modulates the solenoid coils 246–256 according to a predetermined control algorithm to regulate the fluid pressure supplied to the pressure regulator 68 and the clutching devices 26–34, the duty cycle of such modulation being determined in relation to the desired magnitude of the supplied pressures.

With respect to the TCC 26, open converter operation is achieved by deenergizing the coil 256 of fluid valve 190 so that the spool element 220 assumes the position depicted in FIG. 1B. In this case, the fluid pressure in line 74 is directed to the release chamber 56 of torque converter 24, creating a pressure differential across clutch plate 50 which disables engagement of TCC 26. The fluid supplied to release chamber 56 via valve 190 and the fluid supplied to apply chamber 54 via orifice 190 are both exhausted via exhaust line 55 of FIG. 1A.

When it is desired to engage the TCC 26, the coil 256 of valve 190 is pulse width modulated to lessen the fluid pressure in the release chamber 56 of torque converter 24. This creates a pressure differential across clutch plate 50 which moves the friction element 52 into engagement with input shell 38 to initiate TCC engagement.

While the fluid valves 180–190 have been illustrated as spool valves, other types of valves could be substituted therefor. By way of example, valves of the ball and seat type could be used. In general terms, the fluid valves 180–190 may be mechanized with any three-port pulse width modulated valving arrangement.

Input signals for the control unit 270 are provided on the input lines 272–285. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$.

The position transducer 294 is responsive to the position of the engine throttle 16 and provides an electrical signal in accordance therewith to control unit 270 via line 280. A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284. Finally, a brake switch BR provides an indication of service brake application on line 285.

The control unit 270 responds to the input signals on input lines 272–285 according to a predetermined control algorithm as set forth herein, for controlling the energization of the fluid valve solenoid coils 246–256 via output lines 258–268. As such, the control unit 270 includes an input/output (I/O) device 300 for receiving the input signals and outputting the various pulse width modulation signals, and a microcomputer 302 which communicates with the I/O device 300 via an address-and-control bus 304 and a bi-directional data bus 306. Flow diagrams representing suitable program instructions for developing the pulse width modulation outputs in accordance with the teachings of this invention are depicted in FIGS. 4–10.

Figure 2:
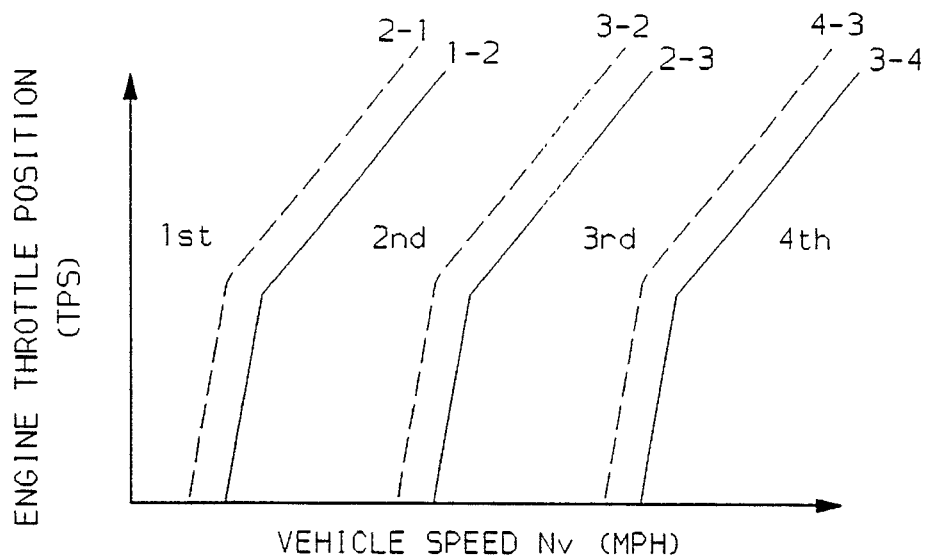
FIG. 2 is a graph depicting a conventional shift schedule for initiating shifting as a function of engine load (throttle position) and vehicle speed.

As indicated above, the present invention is directed to an inference-based control of the shift scheduling which provides improved control when operating the vehicle while cruise control is enabled. The control operates in conjunction with the normal shift schedule to automatically provide manual pulldown operation when cruise control is enabled, based on information inferred from various diverse vehicle operating parameters. The base or default shift scheduling is performed by table look-up as graphically depicted in FIG. 2. For any engine throttle position TPS, the table provides an upshift vehicle speed above which an upshift to the next higher speed ratio is desired, and a downshift vehicle speed below which a downshift to the next lower speed ratio is desired.

Figure 3A:
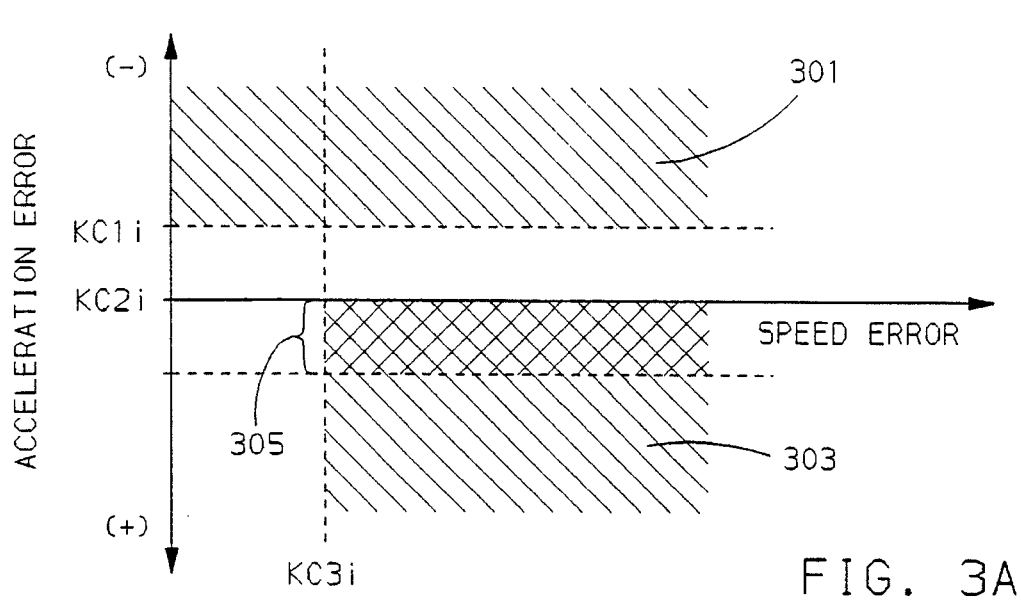
FIGS. 3A and 3B represent graphically certain diverse vehicle operating conditions utilized to determine the desirability of a pulldown in accordance with the present invention.

In the present embodiment, the control utilizes inference factors calculated in accordance with diverse functions of predetermined vehicle operating parameters. FIG. 3A is generally illustrative of a set of inference factor calculations for use in CRUISE. The horizontal axis represents positive speed error; that is to say conditions where the actual vehicle speed is below the operator set speed. The vertical axis represents negative acceleration error and positive acceleration error above and below the origin respectively. Negative acceleration error corresponds to acceleration in excess of a cruise system desired acceleration and positive acceleration error corresponds to acceleration less than the cruise system desired acceleration. In CRUISE the desired acceleration is zero. Predetermined limits KC1–KC3 have lower case "i" designations signifying the "ith" of "n" such limits corresponding to the "ith" of "n" inference factors.

The hatched areas signify relational truths as between acceleration error and speed error which result in a change in value of the "ith" inference factor. All other areas signify relational truths which result in no change to the "ith" inference factor. The hatched area labeled 301 corresponds to acceleration errors less than a calibrated limit KC1i regardless of speed error, which results in a decrease of the "ith" inference factor. The hatched area labeled 303 corresponds to acceleration errors greater than a calibrated limit KC2i AND speed error greater than a calibrated limit K3Ci, which results in an increase of the "ith" inference factor.

In the present embodiment, three such CRUISE inference factors are calculated (i=1 to 3). The truths defined by each "ith" set of calibration limits KC1i, KC2i and KC3i thereby represent diverse functions of the error quantities. Exemplary truths include: (1) < large negative acceleration error; (2) < moderate negative acceleration error; (3) > small positive speed error AND positive acceleration error; (4) > moderate positive speed error AND positive acceleration error; (5) > large positive speed error AND > moderate negative acceleration error.

Once the particular truth is determined, the "ith" inference factor is updated in accordance therewith. Truths corresponding to area 301 result in a decrease of the "ith" inference factor while those corresponding to area 303 result in an increase thereof. A further feature of the CRUISE mode inference logic applied results in a scaled increase of the "ith" inference factor. The area 305 which is a subset of the area 303 corresponds to acceleration errors from the limit KC2i to the limit KC2i plus a predetermined positive offset. This feature allows for more precise control of the increase rate of the inference factors. For example, a minimum increase of inference factor occurs at an acceleration error equivalent to limit KC2i. As the acceleration error approaches the limit KC2i plus the offset from within the area 305 larger increases of the inference factor occur up to a predetermined maximum amount at the limit KC2i plus the offset. Acceleration errors greater than the limit KC2i plus the offset will result in an increase of the inference factor of the predetermined maximum amount.

Figure 3B:
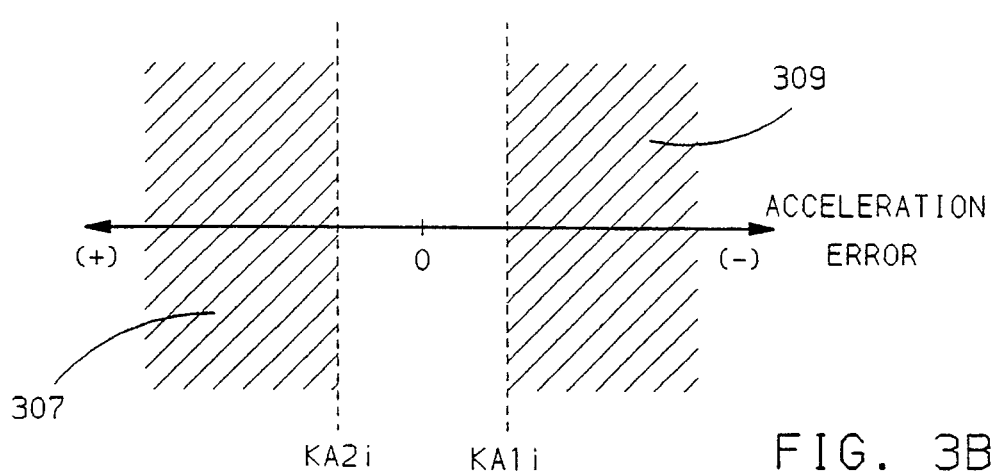

In similar fashion FIG. 3B is generally illustrative of a set of inference factor calculations for use in ACCEL. The horizontal axis represents negative acceleration error and positive acceleration error to the right and left of the origin respectively. Negative acceleration error corresponds to acceleration in excess of a cruise system desired acceleration and positive acceleration error corresponds to acceleration less than the cruise system desired acceleration. In ACCEL the desired acceleration is non-zero and positive. Predetermined limits KA1i and KA2i have lower case "i" designations signifying the "ith" of "n" such limits corresponding to the "ith" of "n" inference factors.

The hatched areas signify truths corresponding to the acceleration error which result in a change in value of the "ith" inference factor. The non-hatched area signifies relational truths which result in no change to the "ith" inference factor. The hatched area labeled 309 corresponds to acceleration errors less than a calibrated limit KA1i, which results in a decrease of the "ith" inference factor. The hatched area labeled 307 corresponds to acceleration errors greater than a calibrated limit KA2i, which results in an increase of the "ith" inference factor.

In the present embodiment, two such ACCEL inference factors are calculated (i=1 to 2). The truths defined by each "ith" set of calibration limits KA1i and KA2i thereby represent diverse functions of the error quantity. Exemplary truths include: (1) < small negative acceleration error; (2) > small positive acceleration error; (3) > large positive acceleration error.

Once the particular truth is determined, the "ith" inference factor is updated in accordance therewith. Truths corresponding to area 309 result in a decrease of the "ith" inference factor while those corresponding to area 307 result in an increase thereof.

Figure 4:
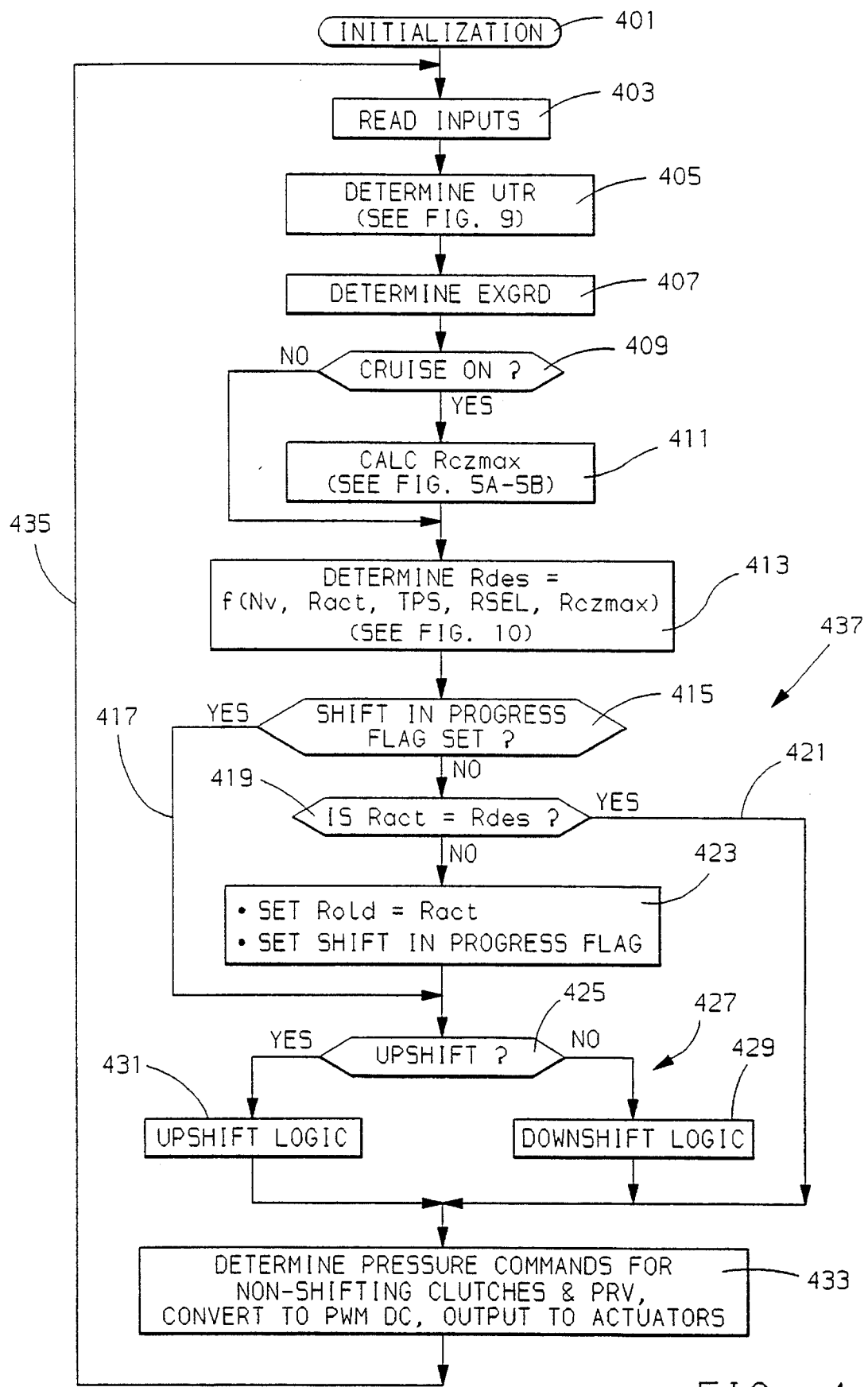
FIGS. 4–10 depict flow diagrams representative of computer programs executed by the computer based control unit of FIG. 1A in carrying out the control of the present invention.

The flow diagrams of FIGS. 4–10 represent program instructions to be executed by the microcomputer 302 of control unit 270 in mechanizing the ratio shifting control of this invention. The flow diagram of FIG. 4 represents a main or executive program which calls various subroutines for executing particular control functions as necessary. The flow diagrams of FIGS. 5–10 represent the functions performed by those subroutines which are pertinent to the present invention.

Referring to the main loop program of FIG. 4, the reference numeral 401 designates a set of program instructions executed at the initiation of each period of vehicle operation for initializing the various tables, timers, etc., used in carrying out the control functions of this invention. Following such initialization, the instruction blocks 403–433 are repeatedly executed in sequence, as designated by the flow diagram lines connecting such instruction blocks and the return line 435. Instruction block 403 reads and conditions the various input signals applied to I/O device 300 via the lines 272–285, and calculates various terms used in the control algorithms, including the present input torque Ti and the speed ratio No/Ni. Input torque Ti is estimated according to well known relationships between manifold absolute pressure (MAP), engine pumping efficiency (P) and a mechanical friction term as a function of engine speed Tf(Ne) following the general expression:

$$Ti=(MAP*P)-Tf(Ne)$$

Of course other factors may be included in the estimation of input torque including predicted quantities for accessory loads, torque converter multiplication ratio, spark retard and exhaust gas recirculation among others. Such torque estimations are well known in the art.

Figure 8:
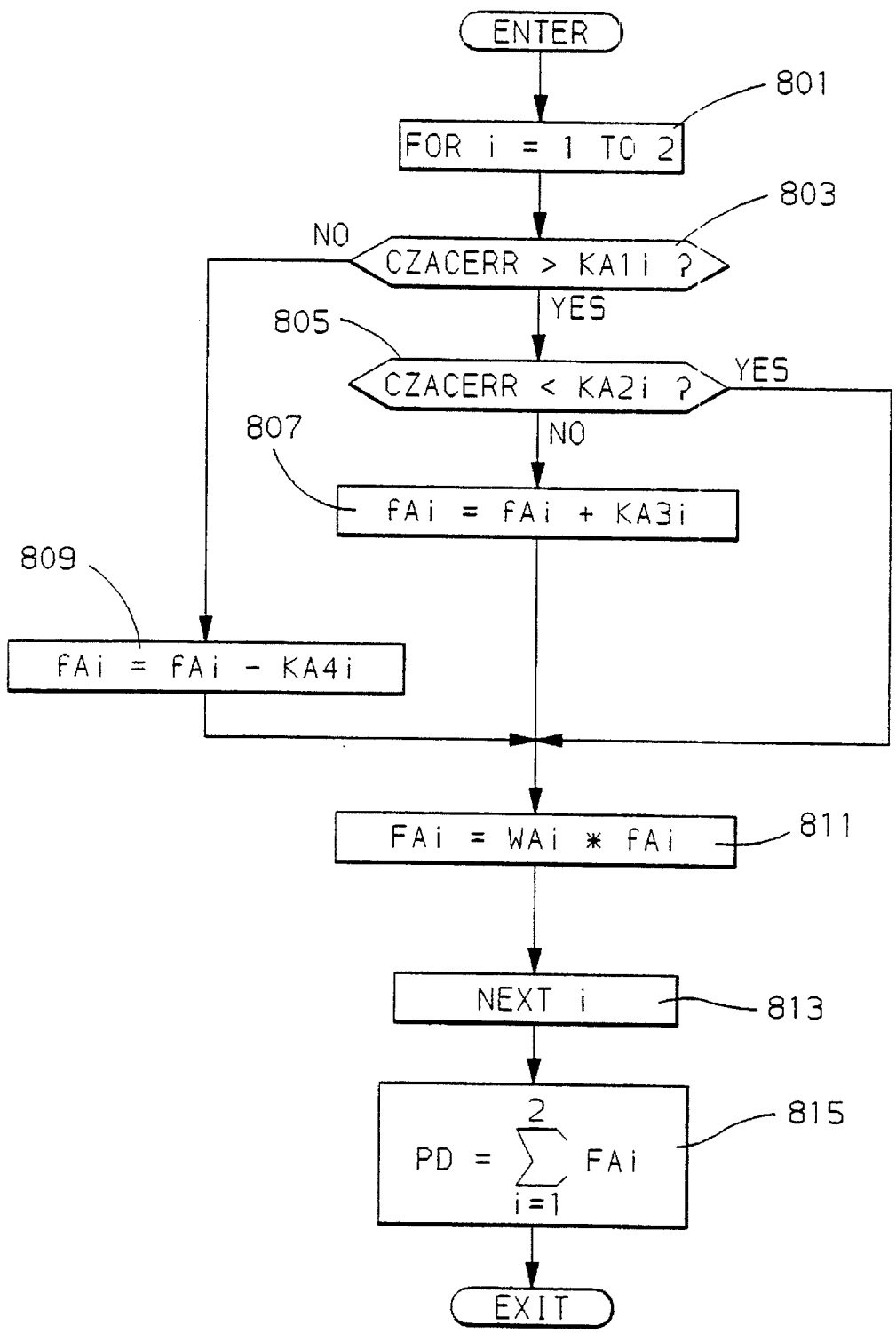
Figure 9:
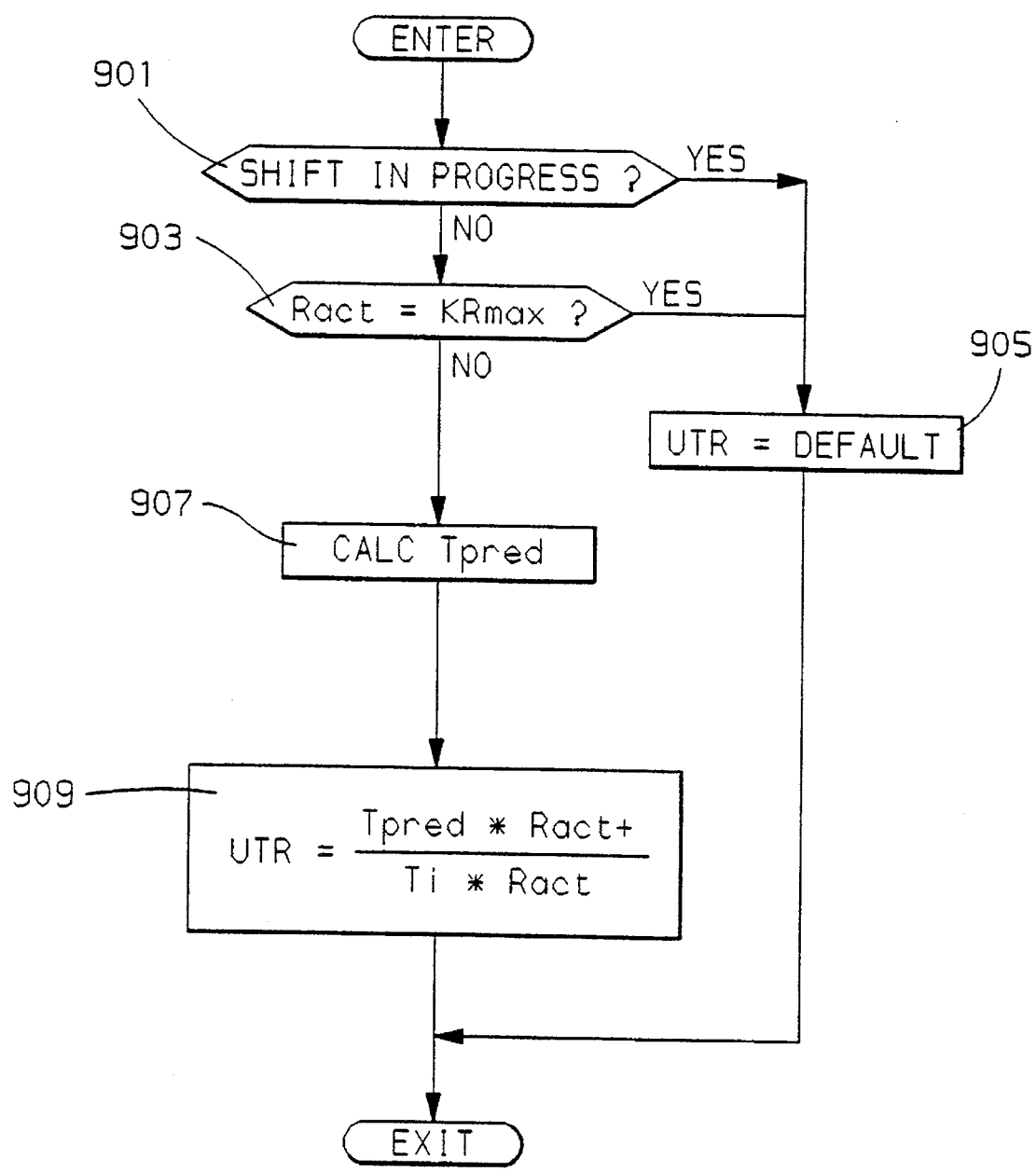

Block 405 determines a variable term, Upshift Torque Ratio (UTR), as set forth in detail in the flow diagram of FIG. 9. The block 407 determines a term, Excess Gradeability (EXGRD), as set forth for example in U.S. Pat. No. 5,172,609 to Nitz et al., issued on Dec. 22, 1992 and assigned to the assignee of the present invention. The block 409 determines whether the control of the present invention is to be implemented. Where cruise control is activated, that is to say when the system is "on" and responsive to operator input, block 411 is executed. Otherwise, block 411 is bypassed and the control of the present invention is not executed. Block 411 pertains to the detail in the flow diagram of FIGS. 5A–5B as indicated and includes the routines of FIGS. 6–8. The block 413 determines the desired speed ratio, Rdes, in accordance with a number of inputs including present ratio Ract, throttle position TPS, vehicle speed Nv, range selector position RSEL and the maximum desired speed ratio as determined in accordance with the pulldown determinant and is set forth in detail in the flow diagram of FIG. 10, as indicated.

The blocks designated by the reference numeral 437 include the decision block 415 for determining if a shift is in progress, as indicated by the "SHIFT IN PROGRESS" flag; the decision block 419 for determining if the actual speed ratio Ract (that is No/Nt) is equal to the desired speed ratio Rdes determined at instruction block 413; and the instruction block 423 for setting up the initial conditions for a ratio shift. The instruction block 423 is only executed when decision blocks 415 and 419 are both answered in the negative. In such case, instruction block 423 serves to set the old ratio variable (Rold) equal to Ract and to set the "SHIFT IN PROGRESS" flag. If a shift is in progress, the execution of blocks 419 and 423 is skipped, as indicated by the flow diagram line 417. If no shift is in progress, and the actual ratio equals the desired ratio, the execution of instruction block 423 and the blocks designated by the reference numeral 427 is skipped, as indicated by the flow diagram line 421.

The blocks designated by the reference numeral 427 include the decision block 425 for determining if the shift is an upshift or a downshift; the instruction block 431 for developing pressure commands for the on-coming and off-going clutches if the shift is an upshift; and the instruction block 429 for developing the pressure commands for the on-coming and off-going clutches if the shift is a downshift. Instruction block 433 determines pressure commands for the PRV and the nonshifting clutches, converts the commands to a PWM duty cycle based on the operating characteristics of the various actuators, and energizes the actuator coils accordingly. The development of suitable pressure commands and PWM duty cycle control given a desired speed ratio is described in detail in the U.S. Pat. No. 4,653,350 to Downs et al., issued on Mar. 31, 1987 and assigned to General Motors Corporation.

Referring to the UTR determination flow diagram of FIG. 9, decision block 901 is first encountered whereat a determination is made as to whether a shift is currently in progress by checking the shift in progress flag. If a shift is currently underway, processing passes to block 905 and UTR is set to a predetermined default value such that its usage in later processing will effect desired results during the current shift. If a shift is not in progress, the actual speed ratio Ract is compared to a calibrated top speed ratio KRmax, such as the fourth gear ratio in the present exemplary four speed transmission. Actual speed ratio Ract equivalence with the top speed ratio KRmax likewise causes bypassing of UTR calculation steps via block 905 whereat a default value for UTR is assigned. Negative responses at both decision blocks 901 and 903 result in execution of blocks 907 and 909 for calculating UTR. Block 907 first calculates a predicted transmission input torque which in essence represents the maximum available input torque in the next higher speed ratio Ract+. This is determined analogously to the determination of present input torque following the same general expression. However, since maximum torque conditions are desired, barometric pressure is substituted for MAP. Additionally, the mechanical friction term, being a function of engine speed, corresponds to the predicted engine speed in the next higher speed ratio Tf(Ne+). The expression takes the form:

$$Tpred=(BARO*P)-Tf(Ne+)$$

Other factors as previously offered for consideration in conjunction with the description of present input torque may be utilized in further refining the predicted torque estimation.

UTR is next determined from the predicted and current input torques and the next higher and current speed ratios as shown in block 909 of FIG. 9. The UTR term represents the ratio of obtainable axle torque in the next higher gear to current axle torque in the current speed ratio. A value of unity represents borderline capability of the powertrain to maintain vehicle speed in the next higher gear at current load conditions. Higher values represent more capability while lower values represent less capability. Generally, it is undesirable to allow an upshift where the UTR is less than unity. UTR is used in later portions of the present control for establishing propriety of upshifts while in cruise to prevent undesirable shift busyness following a forced pulldown as detailed in the description of FIGS. 5–8.

Another variable term calculated for later use in the control is excess gradeability (EXGRD) as shown in FIG. 4, block 407. EXGRD represents a measure of the difference between an empirically determined maximum load gradeability of the drivetrain in the current speed ratio and the apparent grade load. The maximum gradeability represents the capability of the drivetrain to at least balance additional load demands placed thereon in excess of a normal road load. The grade load represents loads in excess of normal loads due to, for example, trailering, grade climbing, head and cross winds, etc. Details of calculating excess grade load are well known and can be referenced in U.S. Pat. No. 5,172,609 to Nitz et al. EXGRD is used in later portions of the present control for predicting the recovery time to a set speed in RESUME of the cruise control system.

Figure 5A:
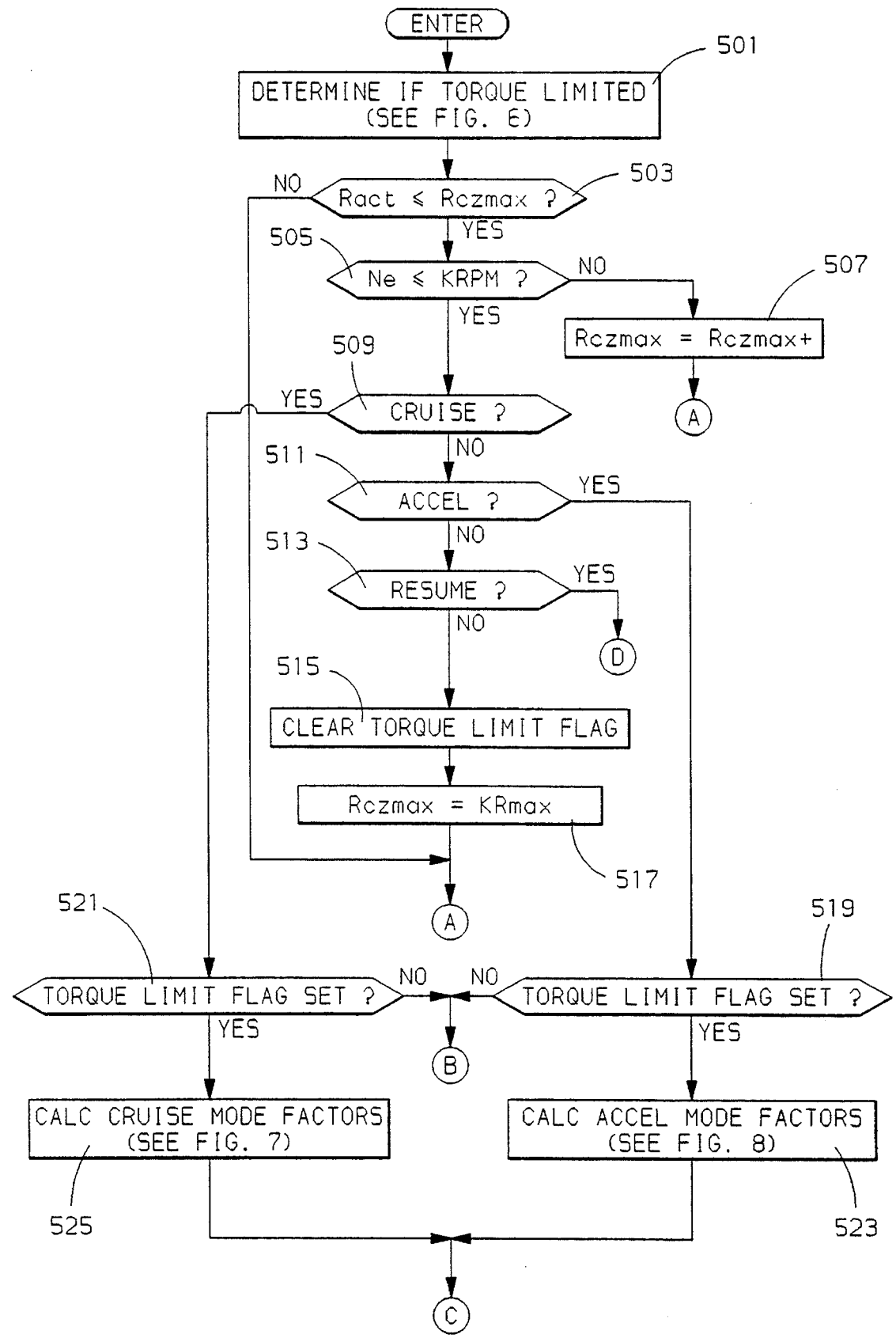
Figure 5B:
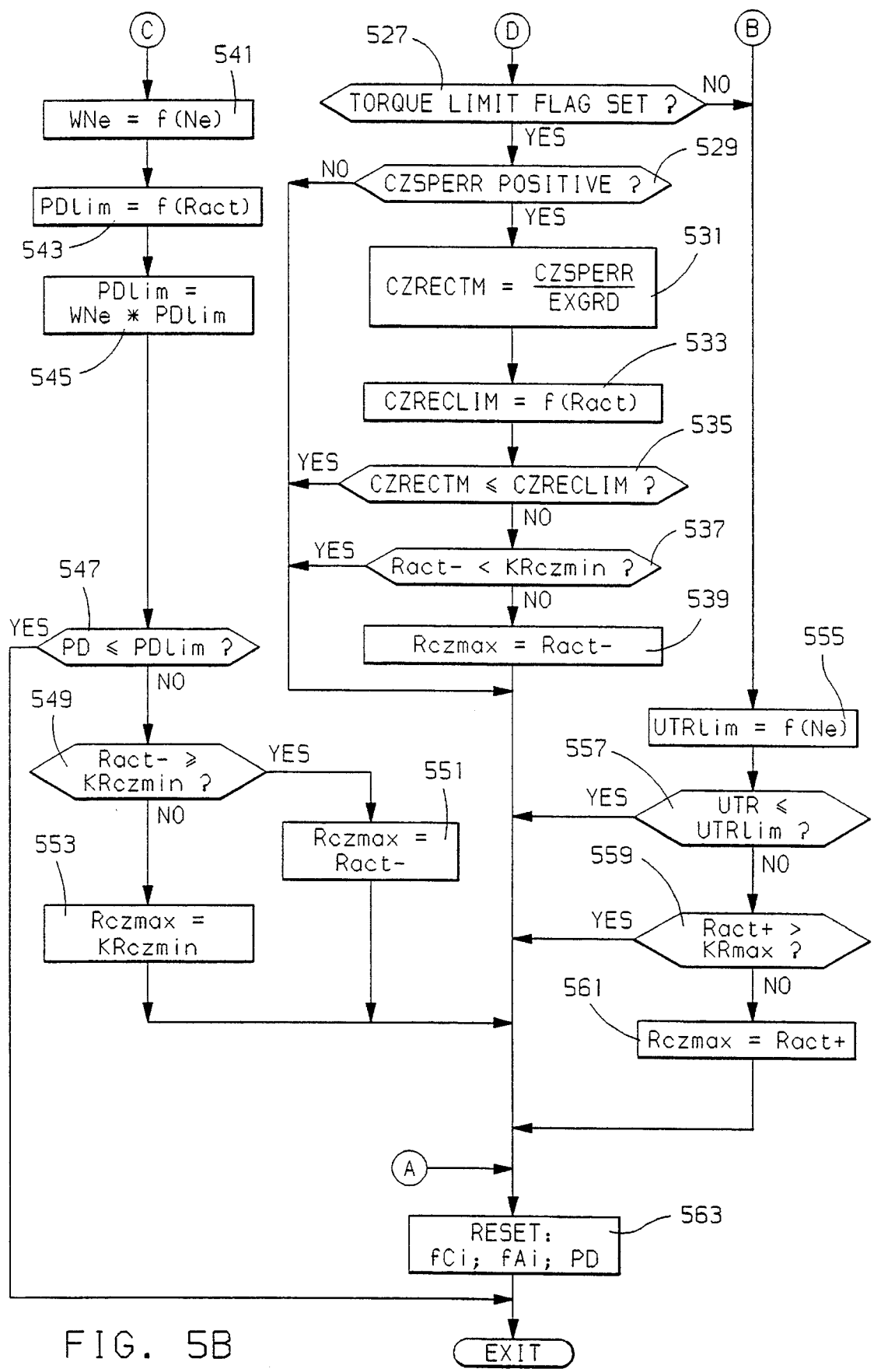
Figure 6:
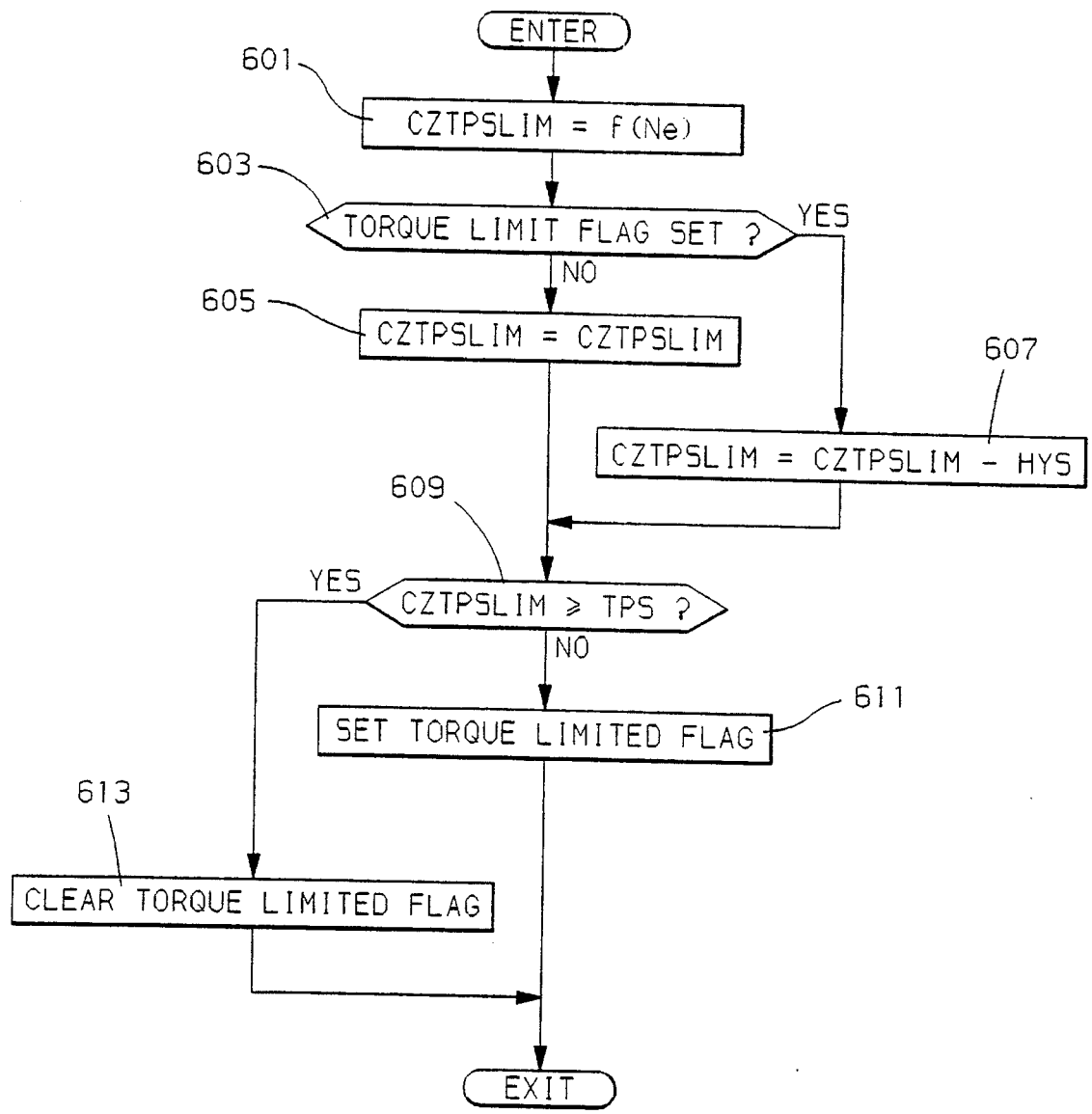

With the cruise control system on and responsive to operator selection of one of the various modes of operation—CRUISE, RESUME and ACCEL—the flow diagrams of FIGS. 5–8 are executed to determine the maximum cruise speed ratio (Rczmax). Beginning with FIG. 5A, block 501 performs a series of steps to determine whether the drivetrain under current conditions is delivering a torque substantially equivalent to capacity. FIG. 6 details steps for performing this calculation. Referring to FIG. 6, block 601 is first encountered whereat a throttle position limit corresponding to a predetermined engine torque is determined. Preferably, this limit corresponds to substantially the maximum torque capacity of the engine at present conditions. Correspondence between engine speed and throttle position allows for the use of an empirically derived two dimensional look-up table having an independent reference variable of engine speed (Ne) and dependant throttle position limit variable CZTPSLIM. Block 603 determined if a torque limit flag is set and if so reduces CZTPSLIM by a hysteresis term at block 607. Block 605 represents setting the limit CZTPSLIM to the look-up value when the torque limit flag does not indicate a predetermined torque limitation. Block 609 next performs a comparison of the throttle position TPS to the limit CZTPSLIM and determines therefrom the state of the torque limit flag at blocks 613 or 611. Processing returns then to block 503 of FIG. 5A.

Block 503 determines whether the actual speed ratio Ract exceeds a previously determined maximum cruise speed ratio Rczmax. Where Ract does exceed Rczmax, a speed ratio change to Rczmax has not yet been completed and further inference calculation processing is bypassed by executing block 563 to reset the various inference factors (fCi, fAi) and pulldown determinant (PD). Thereafter, the inference processing is exited to block 413 of FIG. 4 so that continuation of the ratio change may occur. Block 503 alternatively may determine that Ract does not exceed Rczmax and pass processing to block 505. At block 505, an engine speed check is performed against a calibration constant which, if exceeded, results in block 507 incrementing the maximum cruise speed ratio Rczmax. This engine speed dependant incrementing of a previously decremented maximum cruise speed ratio is a feature which overrides the normal determination of the propriety of incrementing the maximum cruise speed ratio; that is to say, at high engine speeds (KRPM) where the UTR criterion (described later) for incrementing the maximum cruise speed ratio is not satisfied, it may be desirable to allow an upshift to avoid prolonged operation at high engine speeds which may be perceived to be undesirable by the operator. Block 563 is thereafter executed to reset the various inference factors (fCi, fAi) and pulldown determinant (PD).

Operation not exceeding the calibrated engine speed limit results in execution of blocks 509–513 to determine the cruise control system mode presently enabled. Where cruise is "on" yet not enabled in a mode, blocks 515 and 517 are executed whereat the torque limit flag is reset and the maximum cruise speed ratio is set to the top gear of the transmission (KRmax). Thereafter, further inference calculation processing is bypassed by executing block 563 to reset the various inference factors (fCi, fAi) and pulldown determinant PD and control returns to block 413 for shift scheduling in accordance with normal shift pattern control.

CRUISE (block 509) corresponds to speed regulation to a predetermined operator set speed. ACCEL (block 511 corresponds to acceleration regulation to a predetermined acceleration. RESUME (block 513) corresponds to resumption of a previously chosen operator set speed from some other current vehicle speed. Conventional error quantities in cruise control systems include speed error as defined by the operator set speed less the actual vehicle speed, acceleration error as defined by a predetermined desired acceleration less actual vehicle acceleration. In CRUISE, speed error is determined relative the operator set speed with overspeed resulting in a negative speed error and underspeed resulting in a positive speed error. The desired acceleration in CRUISE is zero and therefore any acceleration or deceleration produces a non-zero acceleration error, positive for deceleration and negative for acceleration. ACCEL does not control to a speed, rather it controls to a predetermined acceleration. In that mode, speed error is not provided or undefined and the acceleration error is relative to some non-zero positive acceleration value. RESUME provides for a target speed and therefore a speed error quantity is defined relative thereto. Depending on the precise control methodology employed in RESUME, an acceleration error might be defined. While precise cruise control methodology is beyond the scope of this disclosure, the error quantities mentioned provide preferred quantities for utilization in the inference factor calculations to follow.

CRUISE is first assumed enabled and therefore processing would pass to block 521 for check of the torque limit flag. If the flag is not set, blocks 555–561 are executed as described later. Assuming that the engine has reached the point of maximum torque output, block 525 is executed to calculate the various CRUISE inference factors as represented in the steps of FIG. 7.

Figure 7:
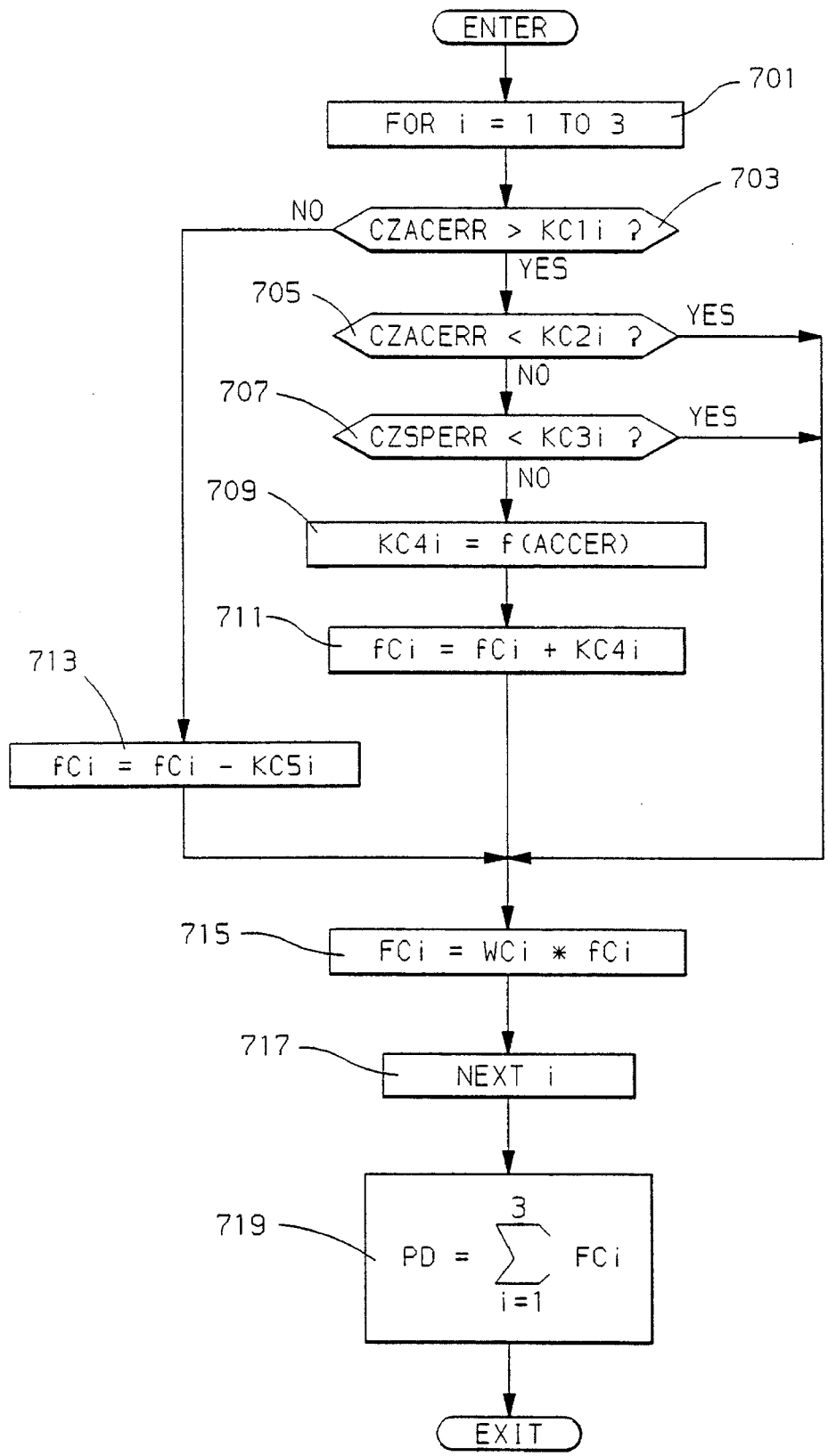

Turning to FIG. 7, a series of repetitive inference factor update steps 703–715 are illustrated. Block 701 represents the number of inference factors to be calculated. In this embodiment, a greater inference factor corresponds to a greater desirability of a forced pulldown. The present embodiment utilizes three such factors although more or less factors may be calculated and employed in the control. The lower case "i" throughout the remaining steps serves to define which of the three inference factors and associated quantities used in the calculation thereof are subject to processing in the corresponding "i" loop. The limits KC1i–KC3i correspond to the limits as illustrated in FIG. 3A. Block 703 compares a predetermined acceleration error (CZACCER) to a limit KC1i. The limit KC1i represents a negative acceleration error threshold which, as mentioned, corresponds to a positive acceleration in CRUISE relative to a zero desired acceleration. If the acceleration error is substantial (i.e. less than or equal to KC1i), then block 713 serves to decrease the present inference factor by a calibrated amount (KC5i). If the acceleration error greater than the limit KC1i, whether corresponding to acceleration or deceleration, a second limit (KC2i) is compared to the acceleration error CZACCER at block 705. This limit KC2i is greater than the limit KC1i and therefore corresponds to lower accelerations or greater decelerations. An acceleration error that is less than this limit KC2i and, as previously determined at block 703, greater than or equal to the limit KC1i represents an acceleration error within an indeterminate range requiring neither an increase nor decrease of the present inference factor. Therefore, the inference factor will not be updated in the current loop.

Where the acceleration error is determined to be outside of the indeterminate range and greater than limit KC1i, block 707 performs a check on the speed error CZSPERR to determine if it is less than a limit value KC3i. KC3i represents a positive speed error, or alternatively stated a vehicle speed below the operator set speed. Negative speed error would indicate overspeed which of course requires less throttle and less torque to close the error to zero and is therefore of no import in the present control. Positive speed error less than the limit KC3i therefore falls within an indeterminate range requiring no increase of the present inference factor. However, positive speed error at least equivalent to the limit KC3i together with the already determined acceleration error at least being equivalent to the limit KC2i results in the increase of the present inference factor at blocks 709 and 711.

A straight forward addition of a fixed calibrated amount to the inference factor could now be performed. However, it is preferred that the inference factor be increased by a scaled amount (KC4i) that is a function of the acceleration error ACCER. Therefore, an acceleration error of zero results in a scaled amount KC4i of a first predetermined value. An acceleration error at least equivalent to a predetermined offset results in a scaled amount KC4i of a second predetermined value. Acceleration errors between zero and the offset are scaled therebetween the first and second predetermined values of KC4i. A preferred way of accomplishing this scaling is to provide a two point look-up table for the first and second predetermined values for KC4i and to interpolate therebetween for the scaled values KC4i corresponding to intermediate acceleration errors.

Block 715 next applies a gain factor WCi to the inference factor fCi to establish the weighted CRUISE inference factor (FCi). Essentially, the gain factor corresponds to an empirically predetermined relative importance of the present inference factor with respect to the other inference factors. Block 717 signifies a loop increment such that the repetitive inference factor update steps 703–715 are performed in accordance with the number of inference factors employed. Finally, the various weighted inference factors FCi are summed to establish the pulldown determinant PD.

In similar fashion, where ACCEL is enabled, block 519 would check for the state of the torque limit flag. If the flag is not set, blocks 555–561 are executed as described later. Assuming that the torque limit flag is set, block 523 is executed to calculate the various ACCEL inference factors as represented in the steps of FIG. 8. The methodology of ACCEL inference factor calculation is similar to that described with reference to the calculation of CRUISE inference factors. However, in ACCEL speed error is undefined and as such cannot be used in the inferential determination of the desirability of a pulldown. Acceleration error is defined and diverse functions thereof provide necessary information from which the desirability of a pulldown may be inferred.

Beginning with block 801 of FIG. 8, it can be seen that the present embodiment is utilizing two ACCEL inference factors. More or less inference factors of course may be employed. The limits KA1i–KA3i correspond to the limits as illustrated in FIG. 3B. Block 803 compares the predetermined acceleration error (CZACCER) to a limit KA1i. The limit KA1i represents a negative acceleration error threshold which corresponds to a positive acceleration in ACCEL greater than some non-zero desired positive acceleration. If the acceleration error is substantial (i.e. less than or equal to KA1i), then block 809 serves to decrease the present inference factor by a calibrated amount (KA4i). If the acceleration error greater than the limit KA1i, whether corresponding to acceleration or deceleration, a second limit (KA2i) is compared to the acceleration error CZACCER at block 805. This limit KA2i is greater than the limit KA1i and therefore corresponds to lower accelerations or greater decelerations. An acceleration error that is less than this limit KA1i and, as previously determined at block 803, greater than or equal to the limit KA1i represents an acceleration error within an indeterminate range requiring neither an increase nor decrease of the present inference factor. Therefore, the inference factor will not be updated in the current loop.

Acceleration error at least being equivalent to the limit KA2i therefore results in the increase of the present inference factor at block 807 by a calibrated amount KA3i.

Block 811 next applies a gain factor WAi to the inference factor fAi to establish the weighted ACCEL inference factor (FAi). Essentially, the gain factor corresponds to an empirically predetermined relative importance of the present inference factor with respect to the other inference factors. Block 813 signifies a loop increment such that the repetitive inference factor update steps 803–811 are performed in accordance with the number of inference factors employed. Finally, the various weighted inference factors FAi are summed to establish the pulldown determinant PD.

After the pulldown determinant PD is established by one of the CRUISE inference factors or ACCEL inference factors, a determination is made as to the desirability of forcing a pulldown. Blocks 541–545 of FIG. 5B are executed to establish a limit PDlim against which a comparison of the pulldown determinant is PD is made. Block 541 first determines a gain WNe as a function of engine speed to be applied to the limit value PDlim. A gain is desirable to make a pulldown more difficult at higher engine speeds since a pulldown will result in an even higher engine speed in a lower speed ratio possibly resulting in objectionable engine noise. PDlim is determined as a function of the present speed ratio as shown in block 543. Lower speed ratios are characterized by greater acceleration capabilities so the limit value PDlim will preferably increase with a decrease in speed ratio. This limit is then weighted in accordance with the predetermined gain Wne to establish the value for comparison to the pulldown determinant PD in block 547. If the limit PDlim is not exceeded then the routine is exited and the maximum cruise speed ratio is maintained at its current value. If the pulldown determinant PD exceeds the limit PDlim, then blocks 549–553 set the maximum cruise speed ratio Rczmax to the next lower speed ratio Ract– unless Rczmax is already equivalent to the lowest allowed cruise speed ratio KRczmin. KRczmin is equivalent to the second gear ratio in the present embodiment. After the determination of Rczmax, block 563 is executed to reset the various inference factors fCi, fAi and the pulldown determinant PD. The routine is exited to block 413 of FIG. 4 for continuation on to establishing the desired speed ratio and accomplishing required shifting.

Figure 10:
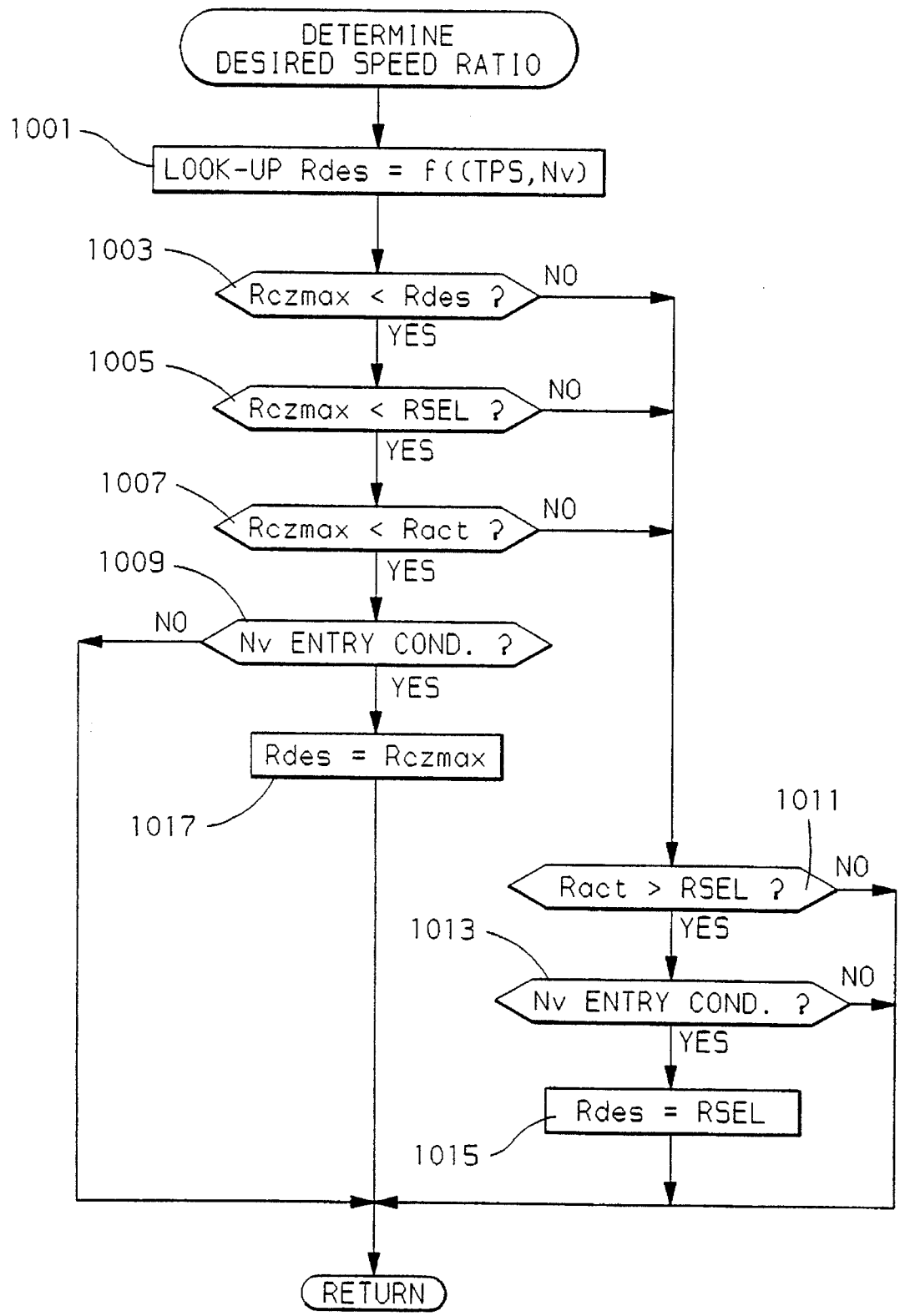

Turning to FIG. 10, a flow diagram for establishing the desired speed ratio is illustrated. Beginning with block 1001, the desired speed ratio Rdes is initially set to the ratio corresponding to the normal shift schedule as represented by the normal shift pattern look-up table as a function of throttle position TPS and vehicle speed Nv. If the maximum cruise speed ratio Rczmax is at least as great as the scheduled ratio Rdes as determined at block 1003, blocks 1011–1015 are executed to compare Rdes to the manual range selector position RSEL. Essentially, the desired ratio Rdes is set in accordance with RSEL so long as (1) the actual ratio Ract is higher than RSEL, and (2) engine speed constraints would not be violated by shifting to the ratio designated by RSEL.

If the maximum cruise speed ratio Rczmax is less than Rdes, blocks 1005 and 1006 determine whether Rczmax is at least equal to the range selector position RSEL or the actual speed ratio Ract. If either comparison at blocks 1005 or 1007 is negative, blocks 1011–1015 are executed to reset the desired speed ratio Rdes as described above. Otherwise, block 1017 is executed to set the desired speed ratio Rdes equal to the maximum cruise speed ratio Rczmax unless the engine speed constraints would be violated as determined at block 1009.

In addition to the inferential shift determinations made in CRUISE and ACCEL, the present control has provisions for inferential determination in RESUME. Referring back to block 513 of FIG. 5A, when RESUME is enabled blocks 527–539 of FIG. 5B are executed in the determination of the maximum cruise speed ratio Rczmax. If the torque limit flag is not set as determined at block 527, blocks 555–561 are executed to determine whether the maximum cruise speed ratio is to be increased as described later. Assuming that the engine has reached the point of maximum torque output, block 529 is executed to determine if the vehicle speed is above or below the desired speed. A positive speed error indicates an underspeed condition and the necessity to accelerate up to the set speed. Therefore, underspeed conditions causes execution of block 531 whereat a predicted time to accelerate to the set speed is calculated as a function of the speed error CZSPERR and the previously determined excess gradeability EXGRD. A negative speed error CZSPERR indicates overspeed and the necessity for vehicle deceleration in order to meet the desired set speed. Therefore, negative speed error causes block 531 to be bypassed as calculation of a recovery time is meaningless for decelerations.

Block 533 is next encountered for determining an upper limit CZRECLIM on the time for recovery to a set speed. This is determined as a function of the actual speed ratio and will generally allow for greater time at lower speed ratios which characteristically exhibit higher accelerations and noise levels than higher speed ratios. Block 535 next compares recovery time CZRECTM to the limit CZRECLIM. If the recovery time is greater than the limit, then block 539 set the maximum cruise speed ratio to the next lower speed ratio Ract– so long as the next lower speed ratio is at least as great as the minimum allowed cruise speed ratio KRczmin as determined at block 537. Block 535 when answered affirmatively indicates that the recovery time is acceptable and a pulldown is not necessary, thereby bypassing blocks 537 and 539. Additionally, where it was determined at block 529 that the vehicle speed exceeds the desired speed, the value of recovery time CZRECTM is assumed to be at a default value lower than any limit value CZRECLIM so bypassing of blocks 537 and 539 is effectuated.

Having established that one of the CRUISE, ACCEL and RESUME modes is enabled and engine operation below the torque limit as established by the state of the torque limit flag, the control proceeds to determine if the maximum cruise speed ratio Rczmax can be incremented. The criterion for allowing a prior pulldown to be canceled is one of adequacy of axle torque in the next higher speed ratio. The term UTR represents the ratio of obtainable axle torque in the next higher gear to current axle torque in the current speed ratio. As earlier stated, a value of unity represents borderline capability of the powertrain to maintain vehicle speed in the next higher gear at current load conditions. Higher values represent more capability while lower values represent less capability.

Block 555 determines a limit UTRlim that is compared to the UTR term at block 557, calculated as described with reference to FIG. 9. UTRlim is established as a function of engine speed Ne and typically decreases with increasing engine speed. If the comparison at block 557 indicates that sufficient axle torque in the next higher speed ratio is (as set by UTRlim), then the maximum cruise speed ratio Rczmax is set to the next higher speed ratio Ract+ so long as a next higher speed ratio is available (i.e does not exceed the top speed ratio of the transmission KRmax) as established at block 559. If UTRlim is not exceeded (557) or if a higher speed ratio is not available (559), then the routine is exited without acting upon the maximum cruise speed ratio Rczmax.

The embodiments of the invention in which an exclusive property or privilege is claimed are defined as follows:

1. A method of shift control in a vehicle having a drivetrain comprising an engine coupled to an automatic transmission having a plurality of speed ratios, said speed ratios being selected for engagement in accordance with a predetermined shift schedule, and a cruise control system enabled in a speed regulation mode to thereby regulate vehicle speed to a predetermined operator set speed, said method comprising the steps:

sensing a parameter;

comparing the parameter to a first limit value;

when the parameter exceeds the first limit value, calculating values of a plurality of inference factors;

generating a pulldown determinant value as a function of the values of said plurality of inference factors;

comparing the pulldown determinant value to a second limit value;

when the pulldown determinant value exceeds the second limit value, establishing a maximum cruise speed ratio; and engaging the one of the plurality of speed ratios that corresponds to the lower of (a) the maximum cruise speed ratio and (b) the speed ratio selected by the predetermined shift schedule.

2. The method as claimed in claim 1 wherein the parameter is a throttle position.

3. The method as claimed in claim 2 wherein the first limit value is determined as a predetermined function of engine speed.

4. The method as claimed in claim 1 wherein the second limit value is determined as a predetermined function of the one of the plurality speed ratios that is presently engaged.

5. The method as claimed in claim 1 wherein the second limit value is determined as a predetermined function of the one of the plurality speed ratios that is presently engaged and engine speed.

6. The method as claimed in claim 1 wherein the step of establishing the maximum cruise speed ratio includes setting the maximum cruise speed ratio to the one of the plurality of gear ratios that is immediately lower than the gear ratio that is presently engaged.

7. The method of claim 1 further comprising the steps:

when the parameter does not exceed the first limit value, calculating a value of a predicted torque capacity indicator, comparing the predicted torque capacity indicator value to a third limit value, and when the predicted torque capacity indicator exceeds the third limit value, establishing the maximum cruise speed ratio.

8. The method of claim 7 wherein the predicted torque capacity indicator is calculated as a function of a predicted torque quantity and an actual torque quantity.

9. The method of claim 7 wherein the third limit value is determined as a function of engine speed.

10. The method as claimed in claim 7 wherein the step of establishing the maximum cruise speed ratio when the predicted torque indicator exceeds the third limit value includes setting the maximum cruise speed ratio to the one of the plurality of gear ratios that is immediately higher than the gear ratio that is presently engaged.

11. A method as claimed in claim 1 wherein each one of said plurality of inference factors is a diverse function of predetermined vehicle speed and acceleration quantities.

12. The method of claim 1 wherein the cruise control system is enabled in an acceleration regulation mode to thereby regulate vehicle acceleration to a predetermined acceleration.

13. A method as claimed in claim 12 wherein each one of said plurality of inference factors is a diverse function of a predetermined vehicle acceleration quantity.

14. A method of shift control in a vehicle having a drivetrain comprising an engine coupled to an automatic transmission having a plurality of speed ratios, said speed ratios being selected for engagement in accordance with a predetermined shift schedule, and a cruise control system enabled in a resume mode for accelerating the vehicle to a predetermined operator set speed, said method comprising the steps:

sensing a parameter;

comparing the parameter to a first limit value;

when the parameter exceeds the first limit value, calculating a value of a recovery time indicator, comparing the recovery time indicator to a second limit value;

when the recovery time indicator value exceeds the second limit value, establishing a maximum cruise speed ratio; and engaging the one of the plurality of speed ratios that corresponds to the lower of (a) the maximum cruise speed ratio and (b) the speed ratio selected by the predetermined shift schedule.

15. The method as claimed in claim 14 wherein the recovery time indicator value is calculated as a function of a vehicle speed quantity and a predetermined measure of excess gradeability.

16. The method as claimed in claim 14 wherein the third limit value is determined as a function of the one of the plurality of speed ratios that is presently engaged.

17. The method of claim 16 further comprising the steps:

when the parameter does not exceed the first limit value, calculating a value of a predicted torque capacity indicator, comparing the predicted torque capacity indicator value to a third limit value, and when the predicted torque capacity indicator exceeds the third limit value, establishing the maximum cruise speed ratio.

18. The method of claim 17 wherein the predicted torque capacity indicator is calculated as a function of a predicted torque quantity and an actual torque quantity.

19. The method of claim 17 wherein the third limit value is determined as a function of engine speed.

20. A method of shift control in a vehicle having a drivetrain comprising an engine coupled to an automatic transmission having a plurality of speed ratios, said speed ratios being selected for engagement in accordance with a predetermined shift schedule, and a cruise control system enabled in one of a plurality of modes including a speed regulation mode for maintaining a predetermined operator set speed, an acceleration mode for maintaining a predetermined acceleration, and a resume mode for accelerating the vehicle to a predetermined operator set speed, said method comprising the steps:

sensing a parameter;

comparing the parameter to a first limit value;

determining the one of the plurality of modes enabled;

when the parameter exceeds the first limit value and one of the speed regulation mode and acceleration mode is enabled, calculating values of a plurality of respective inference factors, generating a pulldown determinant value as a respective function of the values of said plurality of respective inference factors, comparing the pulldown determinant value to a second limit value, when the pulldown determinant value exceeds the second limit value, establishing a maximum cruise speed ratio;

when the parameter exceeds the first limit value and the resume mode is enabled;

calculating a value of a recovery time indicator, comparing the recovery time indicator to a third limit value, when the recovery time indicator value exceeds the third limit value, establishing the maximum cruise speed ratio; and engaging the one of the plurality of speed ratios that corresponds to the lower of (a) the maximum cruise speed ratio and (b) the speed ratio selected by the predetermined shift schedule.

21. The method as claimed in claim 20 wherein the recovery time indicator value is calculated as a function of a vehicle speed quantity and a predetermined measure of excess gradeability.

22. The method as claimed in claim 20 wherein the third limit value is determined as a function of the one of the plurality of speed ratios that is presently engaged.

23. The method of claim 20 further comprising the steps:

when the parameter does not exceed the first limit value, calculating a value of a predicted torque capacity indicator, comparing the predicted torque capacity indicator value to a fourth limit value, and when the predicted torque capacity indicator exceeds the fourth limit value, establishing the maximum cruise speed ratio.

24. The method of claim 23 wherein the predicted torque capacity indicator is calculated as a function of a predicted torque quantity and an actual torque quantity.

25. The method of claim 23 wherein the fourth limit value is determined as a function of engine speed.

* * * * *